Oct. 24, 1950
F. SPITALNY
2,527,158
CLOSURE FASTENER FOR VANITY
CASES AND SIMILAR ARTICLES
Filed July 19, 1948
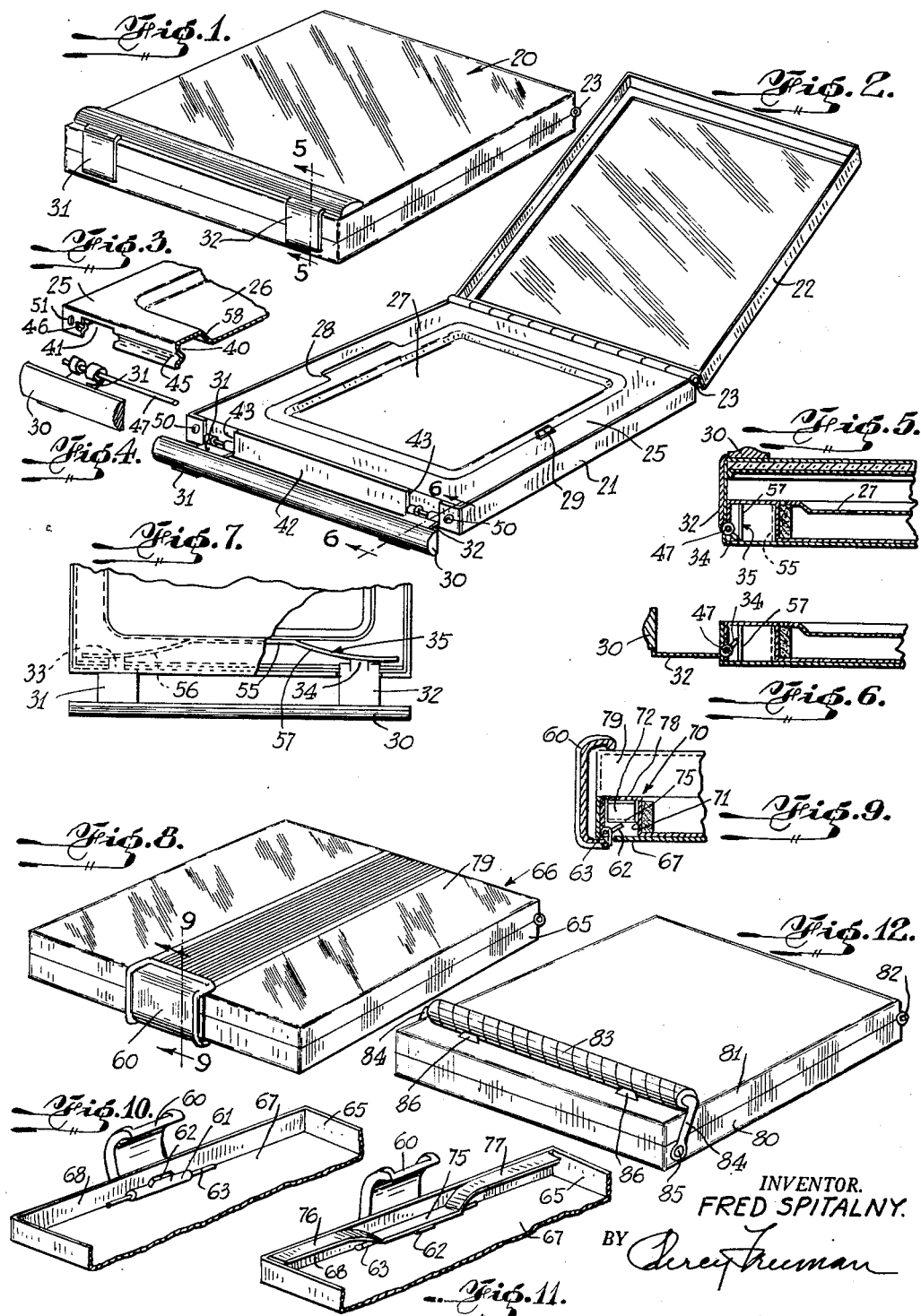
INVENTOR.
FRED SPITALNY.
BY
ATTORNEY.

Patented Oct. 24, 1950

2,527,158

UNITED STATES PATENT OFFICE 2,527,158

CLOSURE FASTENER FOR VANITY CASES AND SIMILAR ARTICLES

Fred Spitalny, Hillside, N. J.

Application July 19, 1948, Serial No. 39,415

3 Claims. (Cl. 220—55)

This invention relates to a closure fastener for compacts, powder boxes, cigarette cases and similar containers for cosmetics and other preparations and articles.

The principal object of this invention is the provision of a closure fastener for boxes and containers of the character mentioned, which is easily operable and which provides a positive locking or latching effect to prevent accidental or untimely opening of the box. Closure fasteners for compacts and similar boxes and containers should fulfill two requirements among others. The first is the requirement that it be easily operable without having to break one's fingernails or to pinch one's skin in order to accomplish the desired result. The second requirement is that the closure fastener remain closed or locked in positive fashion and by positive action until such time as it may be desired to open the box. Closure fasteners commonly in use today suffer from an inability to meet either or both of these requirements. In the present invention, however, these two requirements are met in full measure and the closure fastener herein claimed is not only easy to open and equally easy to close but once it is closed it remains closed under all conditions of normal use until such time as it is desired to open it.

A third important requirement in closure fasteners of this general character is that they be simple and inexpensive to make and that they be suitable for manufacture and assembly in accordance with mass production methods. This requirement too is adequately met by the closure fastener herein claimed, and it is accordingly another object of this invention to provide a closure fastener whose several parts are very simple in their design, easy and inexpensive to make and to assemble. It is not difficult to provide a closure fastener which has a positive latching or locking feature and which is easy to open and to close as and when desired. The difficulty lies in the inability to devise such closure fastener which is so simple in design as to be ideally suited for mass production and assembly purposes, keyed to a buying market of the chain and department store levels. In the present invention the closure fastener not only affords positive protection in preventing accidental opening of the box; it not only enables the user to operate it with great ease and without danger of breaking her fingernails or pinching her flesh; but it also enables the manufacturer to produce it in quantity and at low cost, thereby bringing it within the reach of great numbers of buyers who would otherwise not be able to benefit from the advantages of a closure fastener which is so easy to use and so positive in its latching or locking action.

Preferred forms of this invention are shown in the accompanying drawing, in which:

Fig. 1 is a perspective view of a compact, showing it in closed position and showing the first form of closure fastener herein claimed, holding said compact in said closed position.

Fig. 2 is a perspective view of the same compact, showing it in open position.

Fig. 3 is a fragmentary, perspective view of a detail of said compact and especially of one of the corners of its inside platform, showing the means whereby the closure fastener herein claimed may be held in place in said compact.

Fig. 4 is a perspective, fragmentary view of one end of said closure fastener and especially of that end which is supported by the portion of the inside platform which is shown in Fig. 3.

Fig. 5 is a fragmentary sectional view through the closed box shown in Fig. 1, and especially through the front of said box and the closure fastener which is mounted thereon.

Fig. 6 is a similar view, showing the box and the closure fastener in open position.

Fig. 7 is a fragmentary plan view of the front of the box and of the closure fastener mounted thereon, both the box and the closure fastener being shown in open position.

Fig. 8 is a view similar to that of Fig. 1 of another box on which is mounted a second form of this invention.

Fig. 9 is a view similar to that of Fig. 5 of the front of said box showing both the box and the closure fastener in closed position.

Fig. 10 is a fragmentary, perspective, inside view of the front end of said box with its cover and spring member removed therefrom.

Fig. 11 is a view similar to that of Fig. 10 showing the spring member which controls the movement of the closure fastener shown in Fig. 10.

Fig. 12 is a view similar to that of Figs. 1 and 8, showing still another box on which is mounted still another form of this invention.

The first form of this invention, shown in the first seven figures of the drawing is applied to a conventional compact 20 which has a body or base member 21 and a cover member 22 hingedly connected thereto by means of a hinge 23. Inside the body or base member 21 is a platform member 25 which has a well 26 formed therein to receive a quatity of face powder or other cosmetic preparation. A lid or cover 27 is hingedly connected to platform 25 at 28 and it will be noted that this cover is adapted to provide a closure for well 26 to prevent the powder from spilling out of said well. A latch 29 is provided to lock the leading edge of cover 27 to platform 25 when the compact is not in use.

The closure fastener shown in the first seven figures of the drawing comprises the following elements: a locking or latching bar 30, a pair of hingedly mounted supports 31 and 32 respectively, a pair of lugs 33 and 34 respectively on said supporting members 31 and 32 and a spring 35 which engages said lugs and which controls the pivotal movement of said supports 31 and 32 and of the locking or latching bar 30 which is thereon mounted.

Platform 25 in the invention herein claimed performs two separate and distinct functions. It serves as a conventional well or container for the powder, and also serves as a holding means for the closure fastener herein described. From the point of view of its function as a holder for the closure fastener, its front wall 40 is most important. This front wall has a pair of cut-outs 41 formed therein in registration with hinged supports 31 and 32 respectively and adapted to accommodate said hinged supports. Front wall 42 of body or base member 21 also has a pair of cut-outs 43 formed therein in registration with cut-outs 41 of platform member 25. Hence the hinged supports 31 and 32 are enabled to pass through cut-outs 43 in wall 42 and to enter cut-outs 41 in wall 40. The edges of walls 40 and 42 at their respective cut-outs 41 and 43 engage the side edges of hinged supports 31 and 32 respectively and prevent lateral displacement of said hinged supports and hence of the locking bar 30 which said hinged supports carry.

It is apparent from Fig. 3 that a valley or channel 45 is formed in front wall 40 of the inside platform 25 and that said valley extends the full distance between its two cut-outs 41. Channel 45 continues across said cut-outs for a short distance beyond said cut-outs as shown at 46 in Fig. 3. Channel 45 and channels 46 are axially aligned with each other and they are adapted to accommodate rod or pintle 47 on which supporting members 31 and 32 are respectively mounted. Supporting members 31 and 32 may be pivotally mounted on said rod 47 or they may be fixedly mounted thereon.

When platform member 25 is inserted into the base of the casing 21 a relatively snug or friction fit is thereby provided between the two members, preventing the platform member from falling out of the base member. Inwardly extending bosses 50 are provided in the front wall of base 21 and recesses 51 are provided in the front wall of platform member 25. When the platform member is inserted into the base of the casing these bosses enter their corresponding recesses and provide a locking action which further prevents relative movement between the platform 25 and the base of the casing 21. It will be observed, therefore, that when rod 47 is mounted in channels 45 and 46, it is prevented from falling out of said channel by reason of its abutment with front wall 42 of base 21. When supporting arms 31 and 32 are fixedly mounted on rod 47 it is essential that said rod be loosely mounted in said channels to enable the rod to engage in angular movement therein. When the supporting arms are loosely mounted on said rod, it is immaterial whether or not said rod is free to turn in said channels.

It has above been stated that lugs or extensions 33 and 34 on supporting arms 31 and 32 respectively are engaged by a leaf spring 35. It will now be noted that this leaf spring is bent at two points to provide a central portion 55 and two outer wings 56 and 57 respectively. It will be observed in Figs. 3 and 7 that a channel 58 is formed in platform member 25, between its front wall 40 and its well 26. It is in this channel that spring 35 is mounted, its central portion 55 resting against the front wall of well 26 and its two wings extending forwardly and in the direction of the front wall 40 of said platform member. Lugs or extensions 33 and 34 extend into channel 58 and engage wings 56 and 57 respectively of said spring 35. When the locking bar occupies its closed position (see Fig. 5) these lugs 33 and 34 engage spring wings 56 and 57 below rod 47. When the locking bar occupies its open position (see Fig. 6) said lugs 33 and 34 engage wings 56 and 57 above rod 47. Hence two locking positions or actions are provided, one tending to hold the locking bar in closed position, and the other tending to hold the locking bar in open position. It will be evident from the foregoing that an over-center spring action is provided, whereby the locking bar may be held in a fixed open or closed position.

The second form of this invention is shown in Figs. 8 to 11 inclusive. In principle, the two forms of invention are identical, but in construction they are somewhat dissimilar. In the second form of the invention locking member 60 is a relatively small member which corresponds in function to that of locking bar 30. It is shaped, in cross-section, somewhat like a C and it is directly connected, at its lower end, to pivot member 61, thereby eliminating the need of a supporting arm similar to arms 31 and 32. Hence, locking member 60 not only performs the function of locking bar 30, but it also performs the function of the supporting arms 31 and 32. A lug 62 is formed on pivot member 61 and this lug will be understood to correspond to lugs 33 and 34 formed at the ends of arms 31 and 32. Where arms 31 and 32 are curled around rod 47 to provide the necessary pivot construction, in the second form of this invention, a pin 63, corresponding to rod 47, extends through member 61. Base 65 of casing 66 shown in Fig. 8 has a centrally formed opening in its bottom wall 67 through which pivot member 61 extends. Pin 63 projects on both sides of said member 61 and it occupies the corner formed between said bottom wall 67 and the front wall 68 of said casing base 65.

A platform member 70 is provided in base member 65 and it will be understood that this platform member corresponds to platform member 25 of the first embodiment. It has a channel 71 formed therein which parallels front wall 68 of base 65. In said channel is a leaf spring 72 which is similar to leaf spring 35 of the first embodiment, the sole important difference between the two springs being in their respective positions. In the first form of this invention, central portion 55 of spring 35 bears against the wall of well 26 and its two wing portions 56 and 57 bear against lugs 33 and 34. In the second form of the invention center spring portion 75 bears against lug 62 and its two wing portions 76 and 77 respectively bear against the top wall 78 of channel 71.

Again an over-center action is provided. When locking member 60 is in its closed position (see Fig. 9) spring 72 bears down upon lug 62 and tends to urge it to pivot in clockwise direction on pin 63. This spring action tends to hold the locking member 60 in its closed position against cover 79 of box 66. When locking member 60 is swung manually around in counter-clockwise direction (as seen in Fig. 9) lug 62 will move with it in the same direction, against the action of spring 72, until the lug occupies a position substantially directly above pin 63, so that the action of the spring thereon will tend to hold the lug in that position and by the same token will tend to hold locking member 60 in open position.

It will be noted that in both of the first two forms of this invention the locking member and the lug or lugs which are connected thereto are held in place on the compact or box solely by means of a pin or rod which is mounted between the inner and outer shells or casing members of said compact or box. It is immaterial whether the inner casing or shell is a platform having a powder well or whether it serves to hold other cosmetic items or cigarettes or other articles. The pin or rod not only holds the locking member and its lug or lugs in place but it also serves as the pivot for said member and its said lugs. The spring is held in place in both forms of this invention simply by reason of the fact that it occupies a channel formed in the inner casing member or platform. Neither the pin nor rod on which the locking members pivot, nor the spring which controls the pivotal movement thereof requires a fastening member to hold it in place in the box or compact in which it is mounted.

In the third form of this invention, shown in Fig. 12, a compact is provided which has a base casing member 80 and a cover 81 hingedly connected to each other by means of hinge 82. A locking bar 83 is provided and it will be noted that said bar is mounted on a pair of arms 84 which are pivotally connected by means of rivets 85 to the two side walls of base member 80. Cover member 81 has a pair of lugs or bosses 86 formed thereon and when locking bar 83 is swung into locking position, atop cover 81, it engages these lugs or bosses and is held in locking position thereby. Locking bar 83 is sufficiently yielding so that when it is desired to open the compact it is a simple matter to swing said locking bar out of engagement with said lugs or bosses and thereby free cover 81 so that it may be opened.

The invention herein claimed is herein illustrated by means of three separate and distinct forms and embodiments. It will be appreciated that other forms and embodiments may also be provided within the broad scope and coverage of the invention, and it will be understood, therefore, that the specific forms herein shown and described are merely illustrative of the invention. For example, the platform member 25 shown in the drawing is but illustrative of inside casing members generally, and the nature of the inside casing member will be determined by the function which it is designed to serve. The specific form and shape of the latching members shown in the drawing, are not critical and it will be appreciated that other forms and shapes will be equally appropriate to the purposes of the present invention. The same observation may be made of the shape of the leaf spring shown in the drawing. This shape is also not critical and other shapes and types of springs will be found equally suitable.

Having thus described my invention, what I claim as new and desire to secure by Letters Patent, is:

1. A closure fastener for a compact or similar box having a bottom casing member, a cover casing member hingedly connected thereto, and an inside casing member which is mounted in the bottom casing member, said closure fastener comprising a locking member which is pivotally connected to the front of the base casing member and which is swingable into locking engagement with the top of the cover member, said locking member being mounted on a pin which is disposed between the front walls of the base and inner casing member, and being provided with a lug which pivots integrally therewith on said pin, said inner casing member being provided with a channel paralleling its front wall and with a bow spring in said channel, said spring being in engagement with the lug of said locking member to tensionally hold said locking member in closed position position with respect to the cover of the compact.

2. A closure for compacts and similar boxes having a cover hingedly mounted on a body member and an inside casing member mounted in said body member, said closure fastener comprising a pin which is mounted in the body member and confined between the front wall thereof and the front wall of the inside casing member, at least one opening formed in the front wall of said body member, a supporting arm extending through said opening and engaging said pin for pivotal movement relative to the body member, a lug on said supporting arm extending rearwardly of said pin, inside of said body member, a bow spring mounted in said inside casing member and engaging the end of said lug and a latching member on said supporting arm swingable between locking engagement with the box cover and an unlocked position, said spring serving to hold said latching member both in locking engagement with the cover and in the unlocked position.

3. A closure fastener for vanity cases and similar boxes of the type which have a body casing member, a cover hingedly connected thereto and an inside casing member with a downturned flange telescopically fitted into the body casing member, with said inside casing member having a depressed pan, the wall of which is spaced apart from the front flange of said inside casing member forming a channel therebetween, which channel faces the bottom wall of the body casing member; said closure fastener comprising a pin extending longitudinally between the front wall of the body casing member and said front flange, a groove depressed in said front flange to accommodate said pin, a pair of supporting arms mounted on said pin for pivotal movement relative to said body casing member, said front wall and said front flange having registering openings therethrough through which the supporting arms outwardly extend, a locking bar connected to the outwardly extending ends of said supporting arms, inwardly extending lugs formed on the inner ends of said supporting arms and extending at an angle to said supporting arms and into the said channel, a bow spring disposed longitudinally in said channel, a part of said spring yieldingly bearing against each of said inwardly extending lugs and another part of said spring bearing against the rear wall of said channel whereby the pivotal movement of the supporting arms and of the latching bar mounted thereon is yieldingly controlled by the action of the spring upon said lugs as the lugs swing past dead center with respect to the direction of force of said spring.

FRED SPITALNY.

REFERENCES CITED

The following references are of record in the file of this patent:

UNITED STATES PATENTS

| Number | Name | Date |
|---|---|---|
| 2,196,017 | Kane | Apr. 2, 1940 |
| 2,196,801 | Kreisler | Apr. 9, 1940 |
| 2,217,910 | Leshin | Oct. 15, 1940 |

FOREIGN PATENTS

| Number | Country | Date |
|---|---|---|
| 321,016 | Germany | May 8, 1920 |
| 428,819 | Great Britain | May 20, 1935 |